United States Patent
Gustavsson et al.

(10) Patent No.: US 9,876,337 B2
(45) Date of Patent: Jan. 23, 2018

(54) MACHINE ARRANGED FOR SAWING MICRO TRENCHES AND PLACING DUCTS/CABLES IN MICRO TRENCHES

(71) Applicant: DellCron AB, Stockholm (SE)

(72) Inventors: Conny Gustavsson, Hägersten (SE); Hasse Hultman, Handen (SE)

(73) Assignee: DellCron AB, Stockholm (SE)

( * ) Notice: Subject to any disclaimer, the term of this patent is extended or adjusted under 35 U.S.C. 154(b) by 0 days.

(21) Appl. No.: 14/888,160

(22) PCT Filed: May 22, 2014

(86) PCT No.: PCT/SE2014/000068
§ 371 (c)(1),
(2) Date: Oct. 30, 2015

(87) PCT Pub. No.: WO2014/189427
PCT Pub. Date: Nov. 27, 2014

(65) Prior Publication Data
US 2016/0049776 A1 Feb. 18, 2016

(30) Foreign Application Priority Data
May 23, 2013 (SE) ........................... 1300377

(51) Int. Cl.
*E02F 5/02* (2006.01)
*H02G 1/06* (2006.01)
(Continued)

(52) U.S. Cl.
CPC ............... *H02G 1/06* (2013.01); *E02F 5/02* (2013.01); *E02F 5/101* (2013.01); *E02F 5/14* (2013.01); *F16L 1/032* (2013.01); *G02B 6/504* (2013.01)

(58) Field of Classification Search
CPC ............... E02F 5/10; E02F 5/101; E02F 5/14
See application file for complete search history.

(56) References Cited

U.S. PATENT DOCUMENTS 3,618,237 A * 11/1971 Davis ..................... E02F 5/103
172/40
3,647,003 A * 3/1972 Gagne ..................... E02F 5/103
172/40
(Continued)

FOREIGN PATENT DOCUMENTS

EP    1 207 331 A2    5/2002
FR    2 826 426 A1    12/2002
(Continued)

*Primary Examiner* — John J Kreck
(74) *Attorney, Agent, or Firm* — Blank Rome LLP (57) ABSTRACT

The present invention relates to a machine arranged for sawing micro trenches and placing ducts/cables in micro trenches, said machine comprising a saw blade arranged for sawing a micro trench in an area; said machine further comprising: a stabilizing device arranged for stabilizing the walls of said micro trench when placing ducts/cables into said micro trench, said stabilizing device being positioned immediately behind said saw blade in said micro trench, and said stabilizing device comprising guiding means for guiding at least one duct/cable when placed into said micro trench; said saw blade and said stabilizing device are arranged to be lowered and elevated independently of each other.

14 Claims, 10 Drawing Sheets

(51) Int. Cl.
    *E02F 5/14*    (2006.01)
    *F16L 1/032*   (2006.01)
    *G02B 6/50*    (2006.01)
    *E02F 5/10*    (2006.01)

(56) References Cited

U.S. PATENT DOCUMENTS

| | | | | |
|---|---|---|---|---|
| 4,113,031 | A | * | 9/1978 | Venable .................. E02F 3/386 172/476 |
| 4,430,022 | A | * | 2/1984 | Kinnan .................... E02F 5/102 172/477 |
| 5,090,141 | A | * | 2/1992 | Hall ........................ A01B 35/28 172/744 |
| 6,189,244 | B1 | | 2/2001 | Johnson et al. |
| 2007/0089329 | A1 | * | 4/2007 | Sigmund, Sr. ............ E02F 5/08 37/370 |
| 2014/0028077 | A1 | | 1/2014 | Perkins, Jr. |

FOREIGN PATENT DOCUMENTS

| | | |
|---|---|---|
| GB | 2468785 A | 9/2010 |
| WO | WO 01/23677 A1 | 4/2001 |
| WO | WO 2011093764 A1 | 8/2011 |
| WO | 2012064271 | 5/2012 |
| WO | WO 2012/064271 A1 | 5/2012 |

* cited by examiner

MACHINE ARRANGED FOR SAWING MICRO TRENCHES AND PLACING DUCTS/CABLES IN MICRO TRENCHES

TECHNICAL FIELD

The present invention relates to a machine for sawing micro trenches and placing ducts/cables in trenches. More specifically, the invention relates to a machine according to claim 1.

BACKGROUND OF THE INVENTION

Micro Trenching is expected to become the dominating method for building Fiber-To-The-Home (FTTH) in areas with detached or semi-detached houses. In Sweden around 400 000 houses are expected to be connected to a fiber network during the next 5-10 years. The world market is enormous and may be estimated to around 100-500 times the Swedish market. This means that somewhere between 40 million to 200 million houses may be connected during the next 20 years.

When placing ducts and/or cables in micro trenches a (road) sawing machine is used for sawing trenches in which the ducts/cables are placed.

SUMMARY OF THE INVENTION

An object of the present invention is to provide a machine for sawing micro trenches and placing ducts/communication cables which fully or in part solves the problems and drawbacks of prior art.

The above mentioned object is achieved with a machine arranged for sawing micro trenches and placing ducts/cables in micro trenches, said machine comprising a saw blade arranged for sawing a micro trench in an area; said machine further comprising:
 a stabilizing device arranged for stabilizing the walls of said micro trench when placing ducts/cables into said micro trench, said stabilizing device being positioned immediately behind said saw blade in said micro trench, and said stabilizing device comprising guiding means for guiding at least one duct/cable when placed into said micro trench;
 said saw blade and said stabilizing device are arranged to be lowered and elevated independently of each other Embodiments of the machine according to the invention are defined in the appended dependent claims and disclosed in the following detailed description.

Other advantages and applications of the present invention will be apparent from the following detailed description of the invention.

BRIEF DESCRIPTION OF THE DRAWINGS

The appended drawings are intended to clarify and explain the present invention, in which:
FIG. 11 also defines the coordinate system with origin in the center of the saw blade, used throughout this document.
FIGS. 12, 13 and 14 shows examples of movements of the stabilizing device according to the invention; where

DETAILED DESCRIPTION OF THE INVENTION

To solve the aforementioned and other problems, the present invention relates to a sawing machine comprising a saw blade arranged for sawing micro trenches in an area. The machine further comprises a stabilizing device arranged for stabilizing the walls of the micro trench when placing ducts/cables into the same. Moreover, the stabilizing device is positioned immediately behind the saw blade in the micro trench and comprises guiding means for guiding at least one duct/cable when placed into the micro trench. Furthermore, the sawing machine comprises at least three wheels for driving the machine.

The saw blade and corresponding stabilization device may be integrated with the sawing machine and thereby forming a completely new machine or designed as an attachment unit that can be attached to existing machines. The saw blade and stabilization device may be placed on the right side of the machine or on the left side. Other possible locations are in front of the machine or behind. The following description relates to all possible locations of the saw blade and stabilization device as the description only talks about the relative position of the stabilization device with regard to the saw blade.

The saw blade, and the stabilization device are individually height adjustable between a highest position ("service position") and a lowest position ("operating position").

The movement of the saw blade between the two extreme positions can be made using a rotation movement with a large radius so that the movement is mainly vertical.

The movement of the stabilizing device is more complicated. During the transition between the two extreme positions the stabilizing device may not touch the saw blade or the bottom of the micro trench or the saw blade cover. In addition, as the elevation and lowering of the stabilization device may be performed while cables and/or ducts are inserted in the guiding means in the stabilization device, the design must provide enough clearance and ensure that minimum bending radius for ducts and cables are possible to keep within specified limits.

In its highest position the stabilization device is completely lifted above ground and with some ground clearance and in addition completely retracted and with some clearance behind (with respect to the sawing direction) the saw blade cover. In its lowest position the stabilizing device is max 50 mm above bottom of the micro trench and positioned immediately behind the saw blade with a clearance of max 20 mm. This means that the movement of the stabilizing device between the two extreme positions means a movement in x-direction of more than 0.8*r, where r is the saw blade radius and more than 0.8*r in y-direction.

When sawing, the saw blade wears and thereby its diameter will decrease. This means that the distance between the saw blade and the stabilization device will increase with time. At some point in time the distance may be large enough so that stones in the bearing layer may cause the stabilization device to get stuck in the micro trench. Therefore the link arms that performs the movement of the stabilization device as well as their anchor points in the sawing machine must be very strong. This is important because if the stabilization device is stuck in the micro trench for some reason, substantial forces may be applied to the stabilization device and to its lifting system and anchor points in the sawing machine. To compensate for the wear of the saw blade it is necessary to have the position of the stabilization device adjustable with reference to the current saw blade radius. The adjustment can be implemented using turnbuckles or similar devices or by separate engines.

The link arms for elevation and lowering of the stabilization device are powered by a dedicated engine (eg electrical or hydraulic). Further, a machine with the saw blade mounted on the side of the machine, may have on its left and right sides (in the sawing direction) quick mount attachments means and driving means for both the stabilizing device and the saw blade, respectively. Thereby, any of the left or right sides of the sawing machine can be used for sawing and placing ducts/cables which may be necessary due to hindering infrastructure, traffic situation in the areas, etc.

According to embodiments of the invention, the transition of the stabilization device between the two extreme positions can be made using a linear or sequential linear movement, a pendulum movement or a continuous or sequential movement containing the elements: rotation and movement of the center of rotation in x- and/or y-direction. Finally the movement may be composed by a combination of two or three of the above said movements.

The movement of the stabilization device may be controlled mechanically by link arms with fixed anchor points and performed using a single electrical or hydraulic engine or by a number of electrical or hydraulic engines under software control from a computer.

Figure 12:
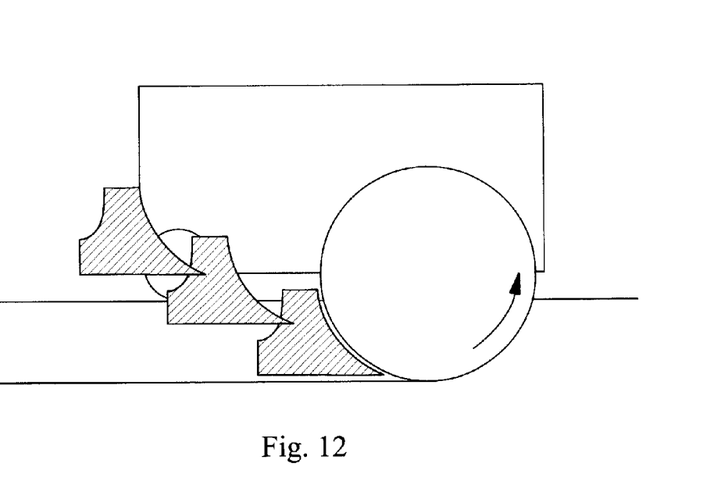
FIG. 12 shows an example of a linear movement.

Said linear movement may be along a straight line with around 15-40° angle to the ground plane. Said sequential linear movement may be a near horizontal movement with 0-25° angle to the ground plane, when the stabilizing device is close to its lowest position and a steeper slope or even a completely vertical movement when the stabilizing device is away from the saw blade. FIG. 12 shows an example of a movement along a straight line.

Figure 11:
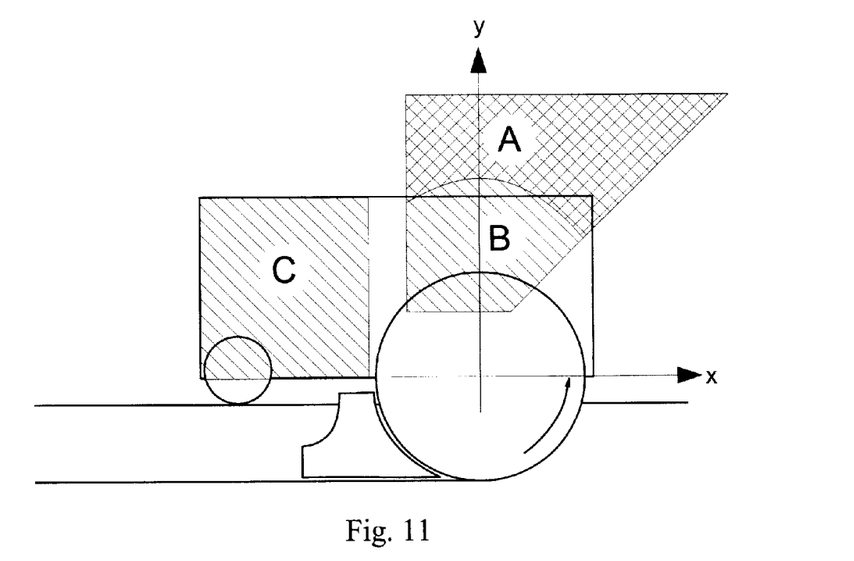
FIG. 11 shows important areas for controlling the movement of the stabilization device. The areas are defined in a coordinate system with origin in the center of the saw blade and are valid for all placements of the saw blade and stabilizing device, whether on the left or right side of the sawing machine or in front of or behind the sawing machine.
Figure 13:
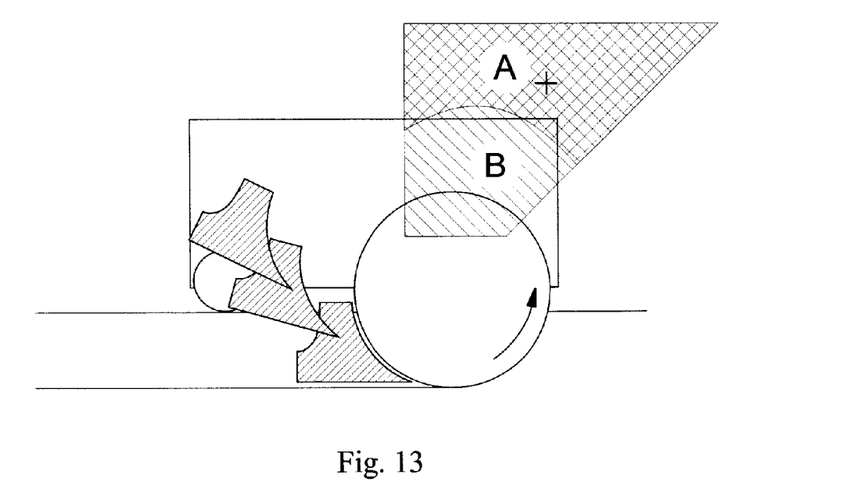
FIG. 13 shows an example of a pendulum movement and FIG. 14 shows an example of a continuous movement containing the elements: rotation and movement of the center of rotation in x- and y-direction

Said pendulum movement has the advantage that it is simple to achieve and gives a strong support. The area A+B in FIG. 11 indicates possible locations for the center of rotation for a stiff pendulum movement. Area B is less attractive because it is an area needed for the saw blade cover and for lifting the saw blade to its service position. The most attractive area is area A. Area A is located above or in front of the saw blade and its cover when the saw blade has been lifted to its service position. FIG. 13 shows an example of a stiff pendulum movement with center of rotation in area A.

Figure 14:
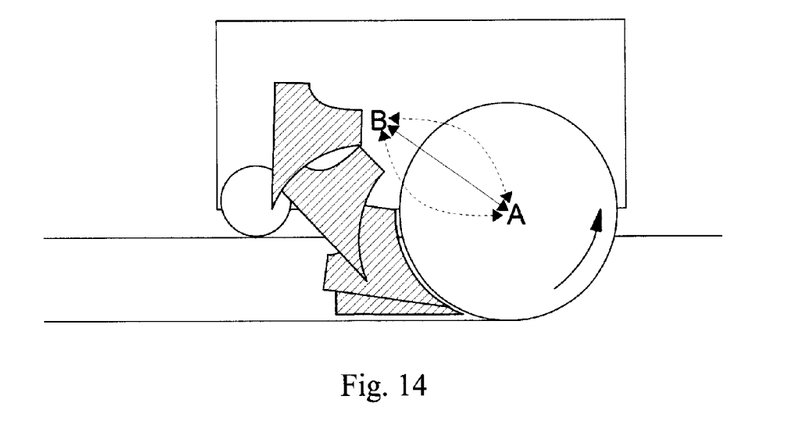
Figure 15:
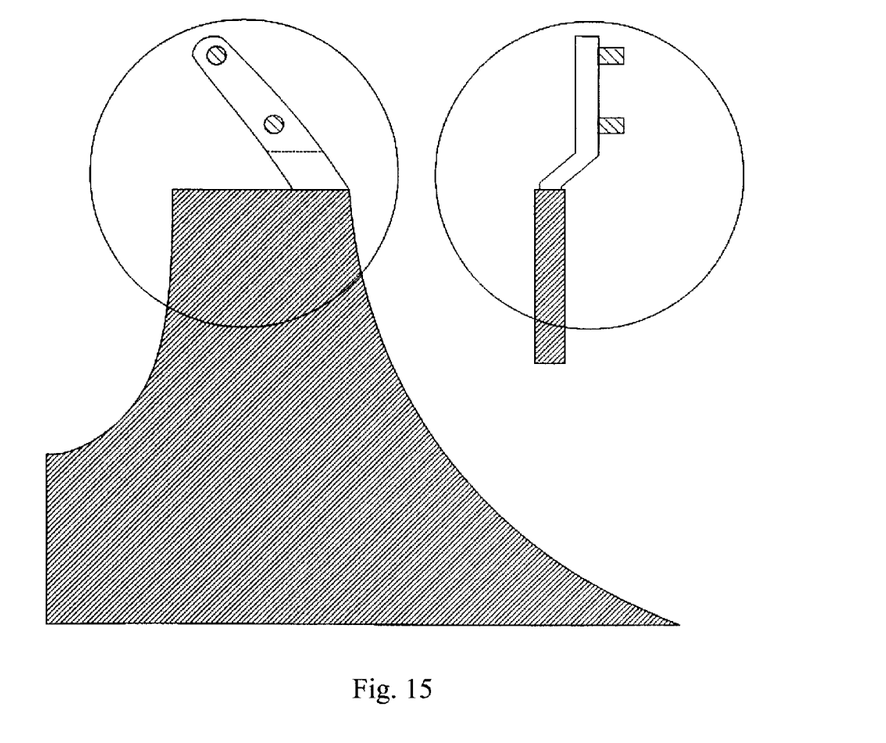
FIG. 15 shows in detail the design of the attachment points for the link arms on the stabilization device so that the ducts and cables inserted in the guiding means are not damaged when the stabilization device is rotated.

A continuous movement of the stabilizing device containing the elements: rotation and movement of the center of rotation in x- and/or y-direction may be achieved using two link arms. The most attractive position for the location of the anchor points of those link arms is area C (in FIG. 11) behind the saw blade cover with respect to the sawing direction. The actual movement of the stabilization device between the two extremes is made through rotation of the stabilizing device and movement of the center of rotation between positions A and B in FIG. 14. The center of rotation of the stabilizing device is close to the center of the saw blade (position A in FIG. 14) when the stabilization device and saw blade are close to their operating positions and close to position B when the stabilizing device is close to its service position. The movement of the center of rotation may be continuous with the rotation or made sequential with the rotation e.g. a rotation only when the stabilizing device is close to its operating position, thereafter a movement of the center of rotation and then again only rotation.

Finally the movement of the stabilization device between the two extremes may be composed of elements of movements from two or more of the previously described movements. Examples of such combination movements are:

EXAMPLE 1

From its highest (transport) position, the stabilization device is lowered using a linear straight down movement (FIG. 12), then it follows a pendulum movement (FIG. 13) until it is close to the saw blade and finally it is rotated into operating position using a rotation movement (FIG. 14) with the center of rotation close to the center of the saw blade. The stabilization device is lifted using the reversed movement.

EXAMPLE 2

From its highest (transport) position, the stabilization device is lowered using a pendulum movement (FIG. 13) until it is close to the saw blade and finally it is rotated into operating position using a rotation movement (FIG. 14) with the center of rotation close to the center of the saw blade. The stabilization device is lifted using the reversed movement.

The saw blade is positioned in its highest position during transportation when the sawing machine is moved to a new geographic position and a trench is not sawn during the transportation. The saw blade is also in its highest position during saw blade replacement. In this case the stabilizing device with all ducts/cables remains in the trench so that the trenching may continue after the saw blade has been replaced. During saw blade replacement, the saw blade cover which may be fitted over the saw blade is opened over the whole side of the cover so that the whole saw blade is accessible.

The stabilizing device is in its highest position during transportation and during the threading of all ducts/cables and during the start of the micro trenching. During start of the trenching, the saw blade is first lowered to its operating position and the sawing machine is advanced around 1-2 m so that there is room in the trench to lower the stabilizing device. There must also be room enough in the trench for an anchor that holds the ducts/cables in place, so that they are not dragged after the sawing machine when it starts to move forward.

To make the threading of ducts/cables easier the stabilizing device may either be openable arranged or the stabilizing device is fitted with an openable cassette so that ducts/cables can be easily laid down in their respective channels. An openable cassette that can be removed from and attached to the stabilizing device will save time in some cases e.g. when the micro trenching is interrupted for some reason and restarted at a later time e.g. the next day.

The removable cassette may be attached to the stabilization device by means of a hinge with a removable pivot. When the pivot has been removed, the cassette can easily be removed. The cassette can also be left in the micro trench when the sawing machine is moved to another location using the following method: remove the pivot and advance the sawing machine a few centimeters so that the stabilization device without the cassette can be lifted. To reattach the cassette to the stabilization device the opposite maneuver is preformed.

Moreover, it has been realized by the inventors that the placement/installation of ducts/cables must be made before the sides of the trench collapses and before stones (or debris) and in particular stones larger than the width of the trench are wedged into the sides of the trench and prevents the installation of the ducts/cables all the way down to the bottom of the trench. By achieving this time (and money) can be saved since the installation can be performed without unnecessary interruptions.

Therefore, the present machine is arranged for sawing micro trenches in an area. In this respect, the machine comprises a saw blade, preferable circular in shape, for sawing/cutting the micro trenches. The produced micro trenches are adapted for receiving ducts/cables which means that the micro trenches have the proper dimensions.

The machine also comprises a stabilizing device arranged for stabilizing the walls of the micro trench when placing ducts/cables, and for this purpose the stabilizing device is positioned immediately behind the saw blade in the micro trench, so that the walls are stabilized until the ducts/cables have been placed/installed by means of guiding means which are also arranged on the stabilizing device.

For stabilizing the walls of the trenches the stabilizing device comprises suitable stabilization elements such as proper side elements which are arranged to "hold up" the walls until the ducts/cables have been installed in the trenches. It is important that the stabilizing device is positioned immediately behind the saw blade so that the trenches sawn by the saw blade are stabilized directly after they are produced so that they do not collapse, or that debris or other dirt fall into the trenches before the ducts/cables have been placed. Therefore, the distance between the saw blade and the stabilizing should be kept larger than 0 mm but less than 20 mm according to an embodiment of the invention. The dimension of the stabilizing device is dependent on the size of the ducts/cables, the number of ducts to be placed at the same time, and the depth for placement in the trench. However, the width of the stabilizing device should be equal to or slightly less then the width of the sawing blade.

Furthermore, for achieving controlled and automatic placement of the ducts/cables the device has also guiding means which guides the ducts/cables into the trench in a controlled and ordered manner. The combination of stabilization and guiding has proved to reduce cost and time in an effective manner since the process of sawing and installing can be performed at the same time. The guides are arranged on the stabilizing device and hence the invention makes it possible to place the ducts/cables into the trench while the trench is stabilized by the device. The ducts/cables can therefore be placed with high precision into the trench (e.g. on the correct height in the trench) since the trench is "clean" as long as the trench is stabilized by the device.

The stabilizing device may be made of any suitable strong material so that the trenches are stabilized. The material should preferably be rigid, tough, hard and yet flexible so as to withstand stress during operation. The mounting of the stabilizing device to the sawing machine should have an amount of flexibility to prevent damage if the stabilizing device is stuck in the trench. Steel or steel alloys are suitable since they can be given the right properties by alloying with different metals such as platinum and manganese. There is limited space in the trench so the walls of the stabilizing device have to be thin as possible so as to be able to accommodate the passing the ducts/cables but still have the properties mentioned above. Steel alloys in the hardness of about 400-700 Brinell have proved suitable for these applications. It has also been realised that the stabilizing device can be made of moulded carbon fibre. Different parts of the stabilizing device can be cast separately and assembled into a stabilizing device assembly.

According to an embodiment of the invention, the device has an inlet and an outlet for ducts/cables, the inlet and outlet being connected to the guiding means. Preferably, the guiding means are channels through which the ducts/cables are guided through the stabilizing device. When in operation, the inlet is preferably above ground and vertically or close to vertically arranged while the outlet is below ground in the trench and horizontally or close to horizontally arranged in order to minimize wear and tear on the ducts/cables. Therefore, a minimum distance between the outlet and the saw blade (at ground level) is slightly longer than the recommended minimum bending radius for the ducts/cables to be installed, which means that the minimum distance is dependent on the recommended minimum bending radius. This normally translates to somewhere between 100 to 500 mm measured at ground level, but other distances are possible. Further, the inlet, outlet and guiding means may together be removably attached on the stabilizing device e.g. in the form of a removable cassette. By having a removable cassette for the guiding means, the installation time shortens in some cases as the time consuming task of inserting many ducts/cables into their respective channels may be avoided It has also been realized by the inventors that an operating depth for the stabilizing device in the micro trench should be up to 50 mm less than an operating depth for the saw blade according to an embodiment. This difference in depth between the saw blade and the stabilizing device, when in operation, decides how quickly the ground level may change (i.e. goes down). The saw blade must have sawed the trench deep enough so that the stabilizing device never touches the bottom of the trench in order to avoid the possibility of the stabilizing device sticking to the ground. This avoids unnecessary forces on the stabilizing device and possible breakage. This may happen when the ground level suddenly becomes lower.

Moreover, according to yet another embodiment of the invention, the stabilizing device and the saw blade are arranged to be elevated and lowered independently of each other. This is advantageous when for example the saw blade has to be changed due to wear or when another type of saw blade is needed (e.g. one type for asphalt and another type for concrete). Further, the stabilizing device may have to be replaced which may easily be performed if the two parts can be lowered and elevated independently of each other. Also, during shorter interruptions in the sawing operation the sawing blade is elevated, but the stabilizing device must remain in the ground, since the need for stabilization of the trench still exists.

Figure 9:
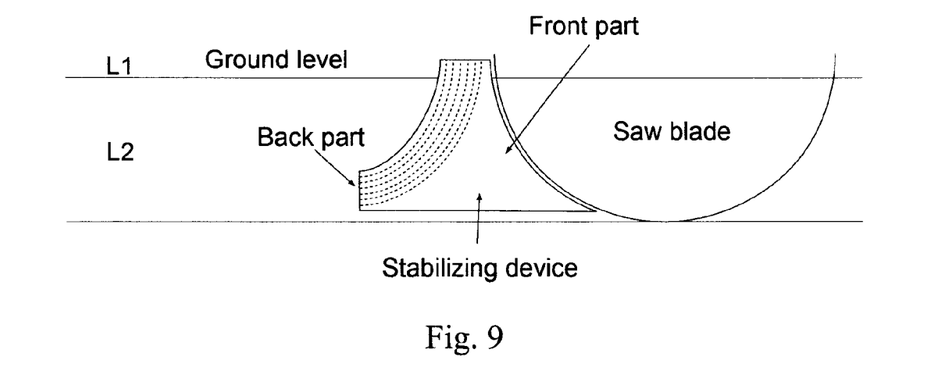
FIG. 9 shows a sawing machine where the stabilizing device is adapted for placing a plurality of ducts/cables at the same time while maintaining the order of the ducts/cables in the micro trench.

FIG. 9 shows an embodiment of a machine according to the invention. The stabilizing device has a front part and a back part, wherein the front part is located immediately behind the saw blade. It can also be seen that the stabilizing device has a section at the front part that has a shape that is complementary to the shape of the saw blade, which in this particular case is circular. Thus, in case the section at the front part has a concave circular shape with the same radius, or close to the same radius, as the saw blade and is placed as close as possible and less than 20 mm away from the saw blade. The reason for this is that the underground part of the stabilizing device must be arranged so close to the saw blade such that it is virtually impossible for dirt, stones and other debris to fall to the bottom of the trench or wedge between the sides of the trench. The guiding means in this embodiment are guiding channels inside the stabilizing device. The channels are illustrated with dotted lines in the figures.

The stabilizing device may also be axe shaped in cross section at the front part in the forward direction.

It has been realized by the inventors that if a micro trench with other geometry (e.g. other width and/or depth) is wanted, the saw blade and the stabilization device must be replaced. As previously stated the stabilization device must be complimentary in shape to the saw blade. Therefore if the saw blade is changed to a saw blade with different radius the stabilization device must be replaced with one with a concave shape with near the same radius.

When the saw blade and stabilization device are replaced with ones with different measures, the lifting arms and/or their anchor points for lifting the stabilization device may have to be changed. This can be achieved by having adjustment screws or turnbuckles on the lifting arms and/or having other anchor points for the lifting arms prepared on the sawing machine.

Finally when changing the saw blade diameter, it may be necessary to change the saw blade cover. The internal shape of the saw blade cover is optimized to the shape of the saw blade in order to give maximum transport of the sawed up debris out through an opening in the front of the saw blade cover. This internal shape may have to be changed, when the saw blade is replaced with one with different diameter, in order to get optimal transport of debris.

Preferably, as mentioned above the stabilizing device has a maximum width in cross section that is equal to or slightly less than a width for the saw blade. The stabilizing device must be wide enough to have room for the ducts/cables to be installed, but small enough so that it can be drawn along the sawed trench.

Another important aspect of the invention is that with the use of guiding means an order of a plurality of ducts/cables is preserved when placed in the micro trench. This is very important when more than one duct is placed at the same time. In one installation scenario, the duct/cable for a certain house is cut at a certain distance after the house. It is important that this duct/cable is one of the ducts/cables on top of the pile of ducts/cables in the trench, so that it can be easily found. The duct/cable must be cut before the stabilizing device. Therefore it is important to know which one of all ducts/cables that enters the stabilizing device will come out on top in the trench. Moreover as the colour of the duct/cable for a certain house is in many cases decided before the sawing begins, the order of the ducts/cables must be arranged so that the duct/cable with correct colour comes out on top, cut to the correct length, in the trench when that particular house is passed.

Figure 6:
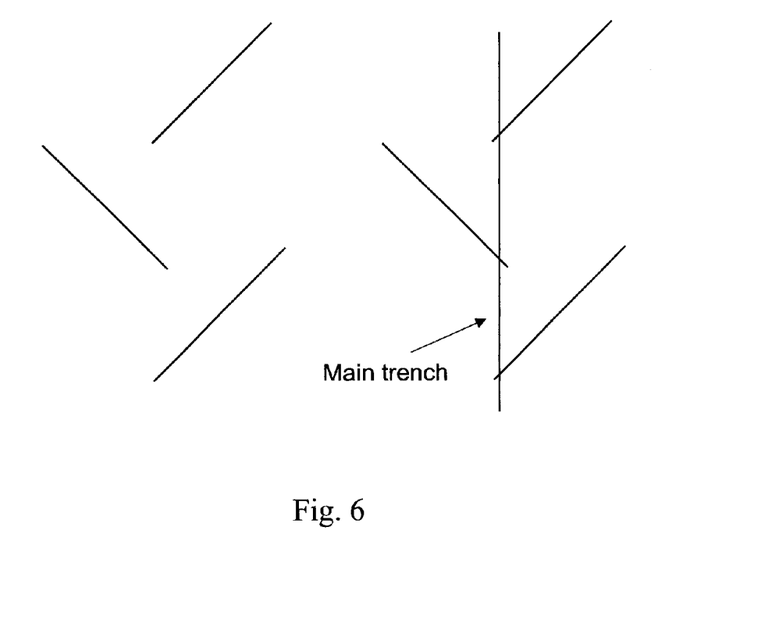
FIG. 6 shows how to saw branches to individual homes from a main micro trench.
Figure 7:
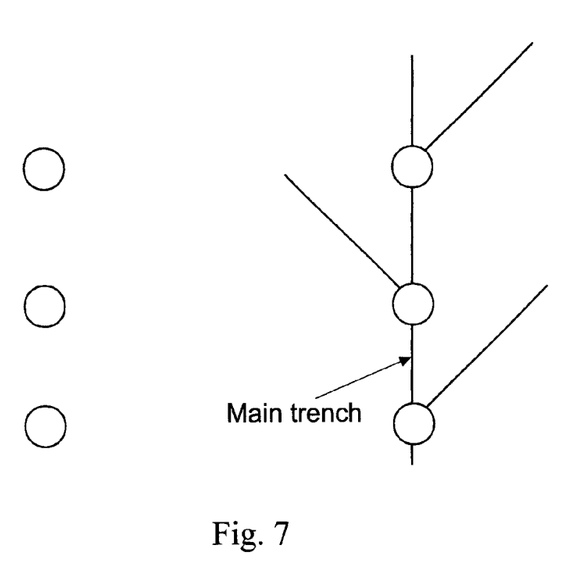
FIG. 7 shows branching to individual homes if boring is used instead of sawing.

A method which allows the placement of a plurality of ducts/cables at the same time has a very high commercial value since the process of placement can be performed much faster than what has previously been know in the art. Therefore, according to this embodiment of the invention, the stabilizing device has a plurality of guiding means each guiding one or a few ducts/cables into the trench. For example, the device may comprise a plurality of channels so arranged that a know order is preserved, which means that an order of the ducts/cables out of the stabilizing device is known form the order of ducts/cables into the stabilizing device, hence the order into and out of the stabilizing device is related and known. This can e.g. be achieved by a one-to-one mapping between the inlet and the outlet of the device, which means that they do not cross each other. The order of the ducts/cables should be arranged in such a way that one of the ducts/cables on top of the pile of ducts/cables in the trench is always the one to be routed to the next location. Therefore, a downmost duct/cable entering the inlet will be an uppermost duct/cable out from the outlet, and the uppermost duct/cable entering the inlet will be a downmost duct/cable out from the outlet. The branching micro trenches may be sawn before the main trench as shown in FIGS. 6 and 7 or the branching micro trenches may be sawn after the main trench is sawn. The particular order in which the trenches are sawn may be decided to achieve the best flow during the installation. Each branching micro trench goes to a final location for one of the ducts/cables from the main micro trench. When the main trench is sawn and the ducts/cables are installed, the uppermost duct/cable is cut (before it enters the stabilizing device) at a certain distance beyond the location of the respective branching trench, so that that duct/cable can be lifted and routed to the final location for that duct/cable, see FIG. 10. If the cut is made correctly the length of the duct/cable will be sufficient so that the duct/cable is long enough to reach the final location without splicing. In this way the ducts/cables are one by one routed to each passed location through the branches.

Depending on the width of the trench and the size of the ducts/cables there may be one or more ducts/cables side by side as the uppermost ducts/cables in the main trench. It is important that the duct/cable next to be routed to its final location is always one of the ones on top. To achieve this is, when cutting the main trench and placing a number of ducts/cables, to cut one of the uppermost ducts/cables, the one designated to this specific location, at a certain distance after passing the corresponding branching trench, so that the cut duct/cable can be lifted and routed through that branching micro trench to its final location. The duct/cable should be cut at a certain minimum distance after passing the corresponding branching trench, so that, when lifted from the main trench and routed towards its final location, the length is sufficient to reach the final location without splicing.

If the stabilizing device (formerly known as "plough") is designed with individual channels for the ducts/cables or with individual channels, each with room for a few ducts/cables, it is easy to know which duct/cable will be on top in the trench and thereby which duct/cable should be cut before the stabilizing device. Example of such stabilizing device is shown in FIG. 9. The stabilizing device in this embodiment has a duct/cable inlet and a duct/cable outlet which is connected to each other by means of a plurality of channels as guiding means (illustrated with dotted lines) for the ducts/cables. The underground outlet of the stabilizing device may in an embodiment comprise a "matrix" (or vector) part so arranged that the channels are arranged in a matrix with n row and m columns, thereby in a controlled way horizontally and/or vertically separating the ducts/cables when placing them in the micro trench.

So in summery; one after the other, cutting one of the uppermost ducts/cables, which one is designated to a certain location, at a certain minimum distance after each branch and thereafter lifting this duct/cable from the main trench and routing it to its final location through the branch.

The machine may further comprise at least one drum arranged for holding the ducts/cables before placing them into the micro trench via the stabilizing device. In this way easy access to the ducts/cables is achieved.

Further, the machine according to the invention may also comprises other suitable means, such as: one or more engine means for powering the saw blade and the stabilizing device and/or for driving means (e.g. drive train and wheels), communication means for wireless communication with e.g. a remote server unit, processing means, memory means, sensors, GPS means, vehicle means, display means for displaying information such as graphics, data base means, reading means for reading mechanical coding means on the saw blade, immobilizer, etc.

Regarding the driving of the saw blade and/or the stabilizing device this can e.g. be performed by means of direct mechanical driving, hydraulic driving and electric driving. The mechanical driving gives the highest power transmission ration while the electrical driving gives the lowest, so the former is preferred if high power is needed which often is the case.

Micro Trenching Technique (MTT)

Figure 1:
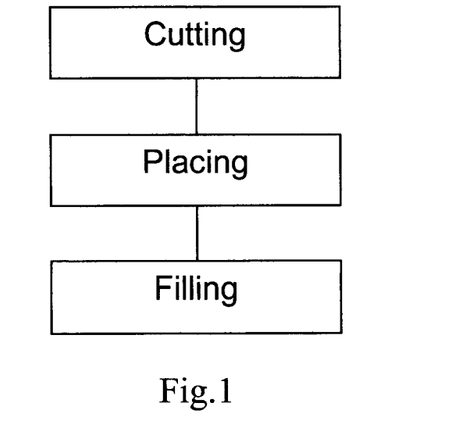
FIG. 1 shows a flow chart of MTT.

A thorough understanding of the MTT method is needed. FIG. 1 shows a flow chart of a MTT method for placing at least one duct/cable below a road surface in the area comprising the steps of:

cutting a micro trench in the area through the first layer L1 into the second layer L2;

placing at least one duct/cable in the micro trench so that the at least one duct/cable is placed below the first layer L1; and filling the micro trench so as to restore the road surface.

Figure 3A:
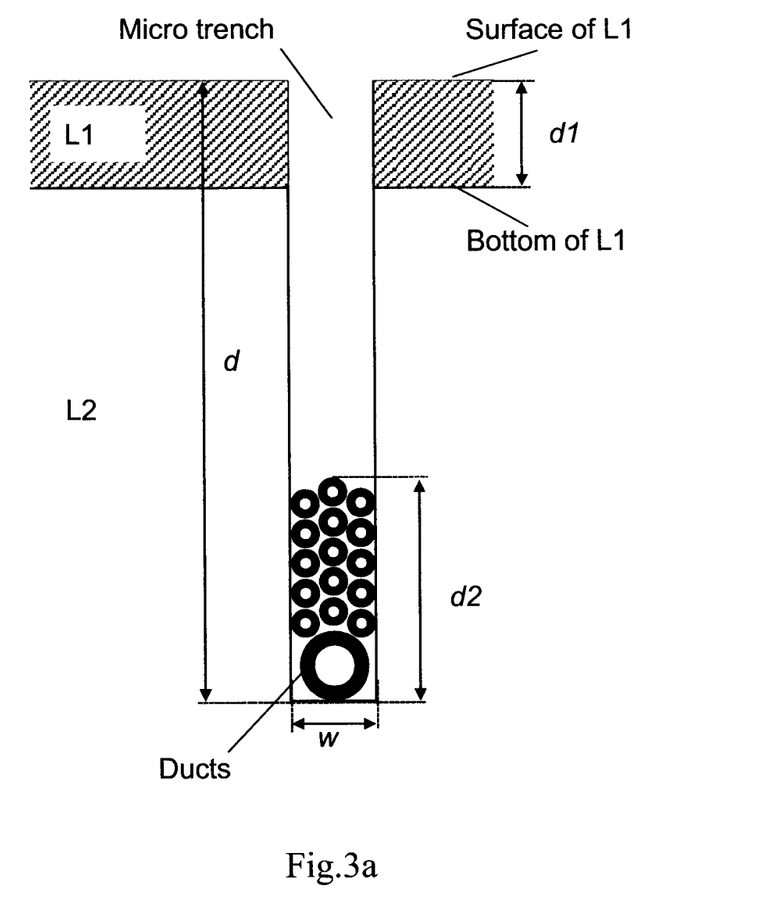
FIGS. 3a and 3b schematically shows a cross section of a roadway area with a micro trench.
Figure 3B:
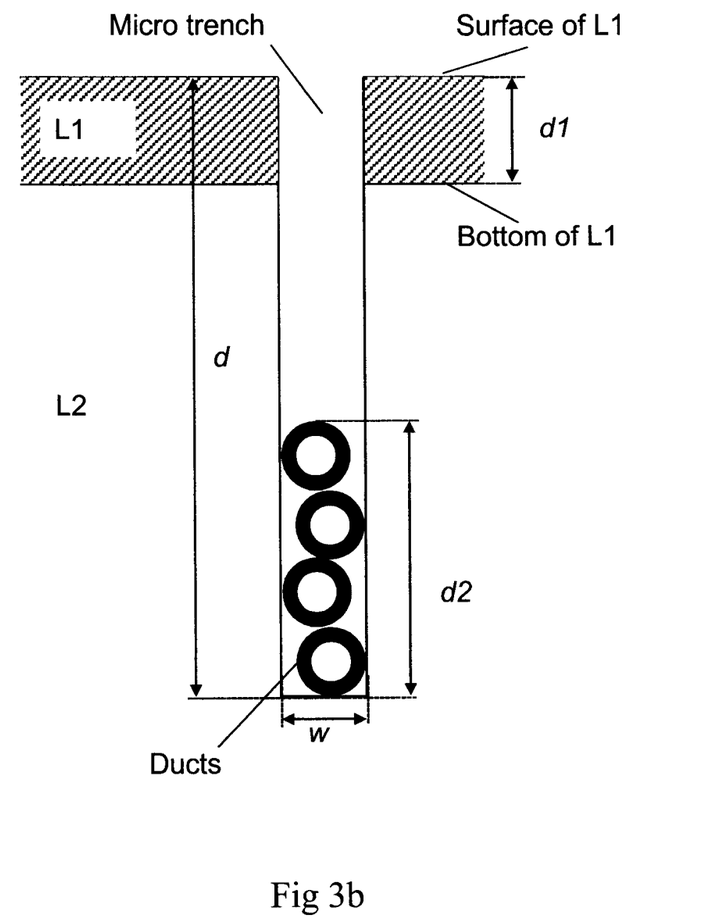

FIGS. 3a and 3b schematically shows a cross section of an area in which a duct is placed in a micro trench. The area in FIGS. 3a and 3b is a three dimensional region of a typical roadway area, wherein the area comprises a first layer L1 being a road layer such as asphalt or concrete, and a second layer L2 being a bearing layer for the first layer L1 and usually consisting of macadam, sand and earth. The second layer L2 is naturally located below the first layer L1 as shown in FIG. 3.

The cutting step involves: cutting the micro trench through the first layer L1 into the second layer L2, which means that the micro trench is cut as shown in FIGS. 3a and 3b. The micro trench is cut so deep that at least one duct/cable is placed in the micro trench below the first layer L1 (i.e. all installed ducts/cables are placed below the first layer L1). Using the present method all ducts and cables for fibre optic networks can be placed deep enough so that they are safe if the road layer L1 is removed and/or replaced, e.g. when repairing the road.

Thereafter, the at least one duct and/or a communication cable is placed in the micro trench. The duct is a duct arranged to hold "air-blown fibre" (so called EPFU) or fibre cables. The duct/s and/or the communication cable/s are placed in the micro trench so that they are entirely positioned below the first layer L1.

Finally, the micro trench is filled with a suitable filling material so that the road surface is restored. The filling material may be sand or any other material with suitable properties. A filling material that is liquid at the time of the filling and which later cures and become highly resistant against compression forces is a preferred filing material. The micro trench is filled with the filling material to a suitable level, and if needed the filling material is thereafter packed with a compactor that fits the width w of the micro trench.

Finally, the micro trench is sealed using a sealing material, such as bitumen, in order to get a water tight sealing. If a water tight sealing is not needed, patching may also be made with cold asphalt which is a simple and cheap method of restoration. A suitable amount of cold asphalt is simply poured and scraped into the micro trench, and thereafter compacted to a smooth and hard surface. Any excess asphalt can then be collected and removed.

The sealing step may according to a preferred embodiment involve the steps of:

sealing the micro trench flush to a bottom of the first layer L1 with a first sealing S1; and sealing the micro trench flush to a surface of the first layer L1 with a second sealing S2.

Figure 4:
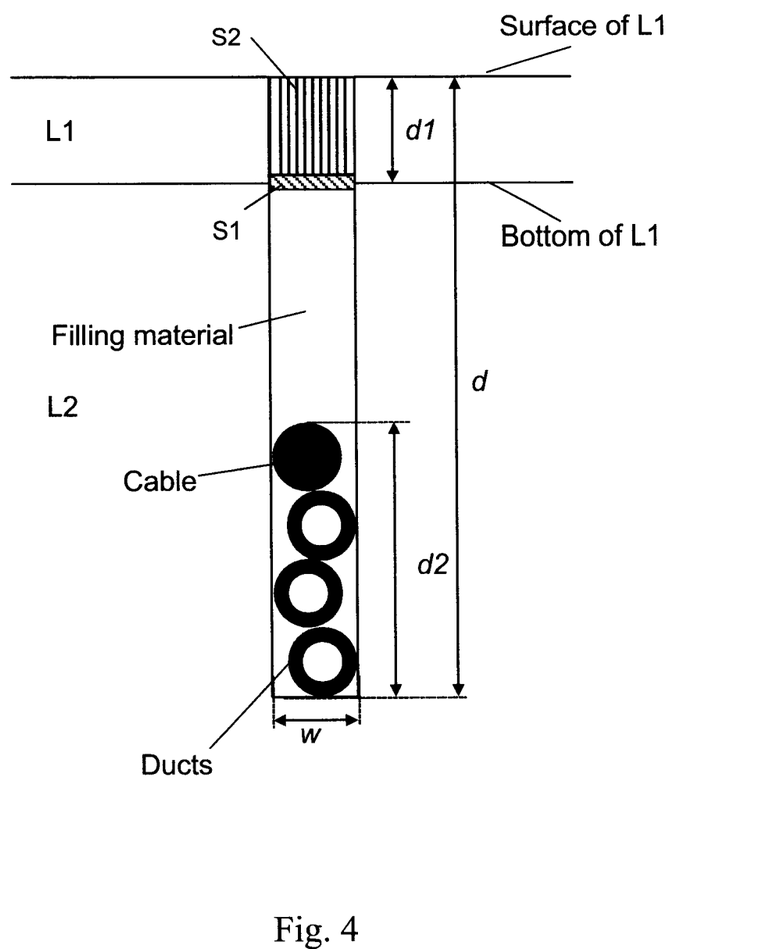
FIG. 4 schematically shows the cross section in FIG. 3, wherein the micro trench is filled with filling material such as sand and sealed with two sealing layers.

FIG. 4 shows the above described embodiment. The surface and the bottom of the first layer L1 are indicated in FIG. 4. In order to obtain a sealed repair with high adhesion it is recommended to pour hot bitumen or bitumen mix when sealing the micro trench. However, other material such as concrete or polymer modified asphalt will work.

The first sealing S1 is put down to seal the micro trench substantially flush with the bottom of the first layer L1 so that the micro trench can be cleaned with a high-pressure washer to remove any residue of sand from the asphalt/concrete edges. After washing, the micro trench may be dried and pre-heated using a propane burner and finally, the micro trench is filled flush with the top surface of the first layer L1 using a suitable sealant such as a hot crack sealant based on bitumen.

According to yet another embodiment, the micro trench is cut with a disc cutter/sawing machine having a diamond coated sawing disc. Such a diamond coated sawing disc can easily saw through even the hardest materials, such as stone and concrete, and has proved very useful in the present application since it provides exceptionally clean cuts when cutting micro trenches. Prior art methods to cut micro trenches, such as using a sawing disc with tungsten carbide teeth, creates small cracks in the edges of the micro trench that will make complete sealing afterwards much harder and more expensive compared the present method.

Figure 8:
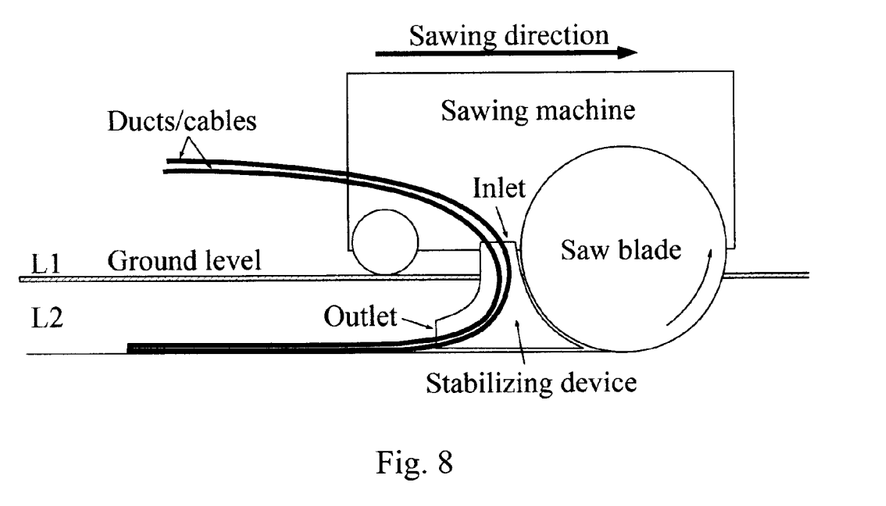
FIG. 8 shows a sawing machine with its saw blade/disc cutter and a stabilizing device for placing ducts/cables immediately behind the sawing disc.

The micro trench is preferably cut/sawed with a modified so-called road-saw (sawing machine) having a diamond coated sawing disc. To further optimise the performance of the road saw in the present application, the inventors have realised that one or more of the following improvements are useful and should be considered as embodiments:

Change in rotational direction of the sawing disc to so-called "up-cut" for improved transport of cuttings;

Modified cover for the sawing disc and a front outlet to optimise the transport of cuttings and reduce spreading of dust and leave the micro trench clean and ready for laying ducts/cables;

Stabilizing device as shown in FIGS. 8 and 9 with one or more guiding means for ducts/cables immediately after the sawing disc so that micro trenching and placing of ducts/cables can be carried out in one process. In case the stabilizing device has guiding means for a plurality of ducts/cables, these guiding means should be arranged so the outlets from the stabilizing device are placed on top of each other in such a way that the order of the ducts/cables from the inlet into the stabilizing device and into the micro trench is preserved;

Trolley drawn by the road saw with holder for drums for ducts/cables and warning tape with tracking wire; and FIG. 8 shows an embodiment using a sawing machine comprising a sawing disc arranged for up-cut. Up-cut is defined as the rotating direction of the sawing disc in relation to the sawing direction as shown by FIG. 8. All known sawing machines have the opposite rotating direction. By changing the rotating direction of the sawing machine to up-cut helps to remove the cut material from the micro trench, thereby providing "clean" micro trenches.

Further, the sawing machine comprises a stabilizing device arranged immediately behind the sawing disc, wherein the stabilizing device has at least one guiding means, such as channels, for guiding the duct/cable when placed in the micro trench immediately after the sawing disc. If a plurality of ducts/cables is placed at the same time, the stabilizing device is arranged to be able to place the ducts/cables in preserved order. This may be achieved by having individual channels for the ducts/cables in the stabilizing device so that the order of the ducts/cables will be maintained through the stabilizing device. Thereby, it is possible before the ducts/cables enter into the stabilizing device to identify which duct/cable will come out on top in the micro trench and thereby making it possible to know which duct/cable to cut for each final location, see FIG. 10.

Generally, the depth d of the micro trench should be larger than the depth of the first layer d1 together with the height d2 of at least one duct or at least one communication cable according to an embodiment, i.e. $d > d1 + d2$ which means that the depth d of the micro trench is larger than the height of the first layer d1 plus the combined height of one ore more ducts and/or communication cables. As can be deduced from FIGS. 3a, 3b and 4, the above mentioned relation holds.

However, costs increase with increased depth d of the micro trench. Therefore, the micro trench should not be deeper than necessary. Normal depth d of the micro trench can be around 400 mm, and unlike the width w of the micro trench, the depth d can often be adjusted continuously while in operation when using a disc cutter. The cutter depth can therefore be reduced gradually as the number of ducts laid in the micro trench is reduced.

Further, the micro trench should not be wider than necessary, since a wider micro trench is more expensive than a narrow micro trench. On the other hand a narrower micro trench can make it more difficult to install the ducts/cables, so there is an optimal width of the micro trench, since e.g. if the micro trench is too narrow, all ducts/cables will be piled on top of each other so that the depth of the top duct/cable will be too shallow.

From the above discussion, the inventors have through tests realised that suitable dimensions for a micro trench should have a depth d between 200-500 mm (and preferably 300-500 mm) and a width w between 10-30 mm (and preferably 15-25 mm) according to an embodiment for installation efficiency and low cost. Further, with these dimensions minimum disruption of traffic is possible when placing ducts/cables since traffic can pass over an open micro trench.

Figure 2:
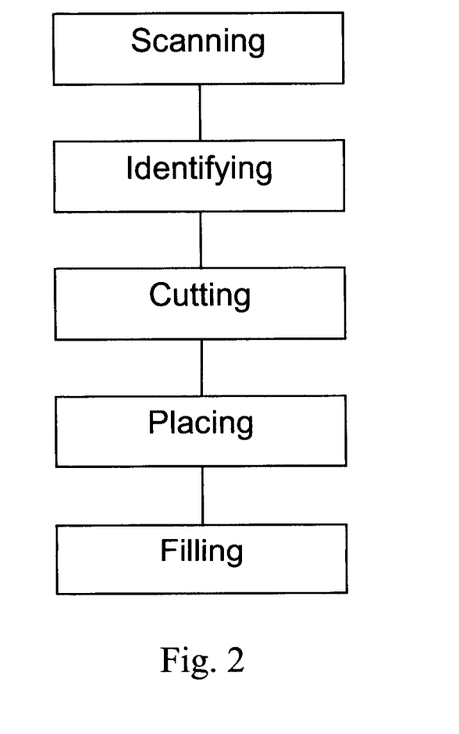
FIG. 2 shows a flow chart of an embodiment of MTT.

Furthermore, with reference to the flow chart in FIG. 2, according to another embodiment, the method for placing at least one duct/cable comprises the steps of:

scanning an area by means of a ground penetrating radar; and identifying obstacles in the area using data generated by the ground generated radar, cutting a micro trench in the area through the first layer L1 into the second layer L2;

placing at least one duct/cable in the micro trench so that the at least one duct/cable is placed below the first layer (L1); and filling the micro trench so as to restore the road surface.

It should be noted that the steps of scanning and identifying are performed before the other steps in the method according to this embodiment.

According to this embodiment, the area is scanned by means of a ground penetrating radar device, such as a GEO-radar or any other suitable equipment.

Thereafter, possible underground obstacles in the area, such as sewer pipes, electrical cables, construction structures, etc. are identified using information generated by the ground penetrating radar device. The scanning and identifying steps means that when performing the subsequent cutting step it may be avoided to accidentally cut/damage obstacles in the area which may result in delay and extra cost in the micro trenching process. After cutting a micro trench in the scanned area, at least one duct and/or a communication cable is placed in the micro trench. Finally, the micro trench is filled with a suitable filling material so that the road surface is restored.

The method may also involve the step of: installing or blowing fibre or fibre cable in one or more ducts if ducts were placed in the micro trench.

It should also be noted that the method described above also may comprise the step of: making one or more branching points connected to the micro trench. Preferably, the branching points may be made by means of a diamond coated core drill or a hand-held sawing machine with a diamond coated sawing chain or disc. As for this described embodiment the method may also comprise the further step of: boring one or more channels from the branching points to one or more houses using controlled or guided boring. It is important that channels are bored below the first layer L1 in the second bearing layer L2. Ducts/cables are thereafter installed in these channels when the drill is pulled back.

Different aspects concerning the layout of micro trenches, branching points and channels, and strategies of cutting, branching, etc, in relation to and incorporated in the present method will be discussed in the following description.

Layout

Figure 5:
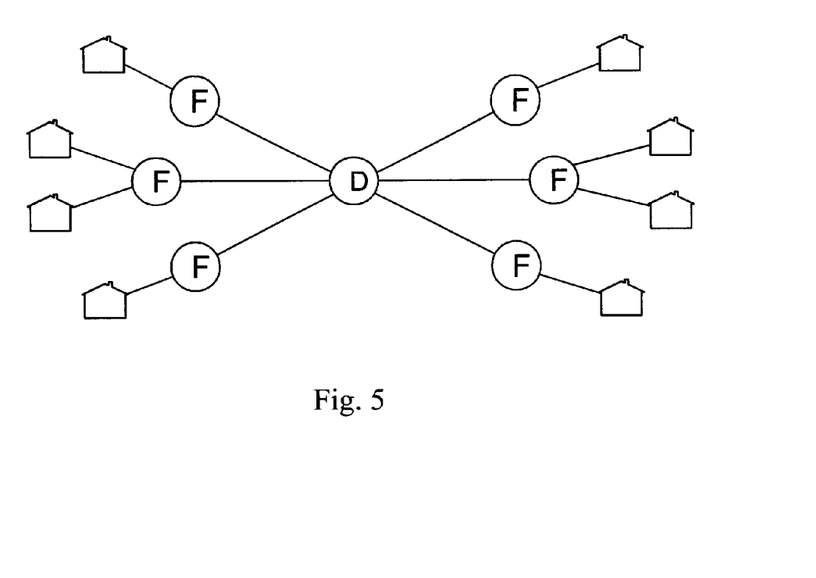
FIG. 5 shows a typical layout of a FTTH network.

FIG. 5 shows a typical logical structure of a Fibre To The Home (FTTH) network in a residential area, where "D" is a distribution node and "F" is a splicing point where larger fibre cables are spliced to smaller ones (or in case of a PON network where optical splitters are placed). The network between a distribution node D and a splicing point F is called distribution network and the network between the splicing point F and the individual homes is called access network. Both the ducts/cables for the distribution network and for the access network can be installed using the present method.

A residential area being constructed with FTTH is normally divided into a number of smaller residential subareas. Somewhere in the residential area or outside of the residential area there must be a site where optical panels and electronics needed to form a so-called distribution node D are housed. The distribution node D can be housed in an existing building or in a small dedicated built building or in a large ground cabinet. Each distribution node D may contain electronics and optical panels for anywhere between a few hundred households up to several thousand households. The size of the area to be built from a single distribution node D can be adjusted within wide limits and depends primarily on practical considerations, such as space in the distribution node D, difficulties with management of a large number of smaller distribution nodes D, etc. This concept can also be adapted for any number of fibres per household.

There are two main types of FTTH networks: point-to-point-networks and point-to-multipoint networks. In a so-called point-to-point-network, the distribution node D contains the other ends of all fibres that originate from the households in the residential area. If e.g. a residential area with 500 households is being equipped with 2 fibres per house, there will be 1000 incoming fibres to the distribution node D. The distribution node D should preferably have a central location in the area being built as shown in FIG. 5.

The fibre structure of a point-to-multipoint-network or a so-called Passive Optical Network (PON) is more or less the same. The difference being that the number of incoming fibres to the distribution node D in this case equals the number of households divided by a factor (e.g. 8, 16, 32, etc.). The examples in the continuing discussion are made assuming that a point-to-point-network is being built. However, described methods also apply to a PON if only the distribution cables are scaled accordingly.

Viewed from the distribution node D, distribution cables extend out to splicing points F in manholes or cabinets. Distribution cables are normally designed for the number of households in the area plus 10% spare so that in the future, newly built buildings easily can be added to the network. In a point-to-point-network, if e.g. a splicing point covers an area with 22 houses and the requirement is two fibres per house, then 48 fibres from the distribution cable are needed. Fibres from the distribution cables are spliced in the splicing points F to fibres from the access cables. These access cables then extend to each one of the houses being connected.

How many houses a splicing point F serves mainly depends on economic issues. If the covered area is too large, this will increase the average length of access cables to the houses, which increases costs. On the other hand, if the covered area is too small the cost for each house will rise in relation to its share of splicing point F and distribution cable. Hence, there is an optimum size to the residential area where the cost is the lowest. The number of houses that would minimise the cost depends mainly on the topography of the residential area and how large the plots of land are on which the houses are standing, but a rule of thumb is that an optimum size is normally somewhere between 16 and 48 houses from each splicing point F.

If micro trenching is carried out using a disc cutter according to an embodiment, the splicing point F should be placed centrally in each residential subarea, with e.g. around 22 houses. The splicing point F can be physically realised in a street cabinet or in a manhole by the roadside. Then, typically 10-12 ducts extend from the ground cabinet or manhole each way along the road. Each of these ducts then extends into each of the houses. Finally, access cables are blown into each of these ducts.

Strategy When Cutting

Usually, residential areas have houses on both sides of a road, and this situation can be tackled in one of two different ways: either micro trench in the roadside on both sides of the road and connect the houses to the closest micro trench, or micro trench on only one side of the road or in the middle of the road and connect houses on both sides to this micro trench.

However, to minimise the number of micro trenches across the road, start to micro trench to a boundary between two properties (houses) on the opposite side of the road according to an embodiment. Then place a duct/channeling tube in that micro trench to each one of the two properties. In this way, a micro trench across the road need only be made for every second property on the opposite side of the road. Micro trenching across the road for every second property then this will be a cheap and cost effective method.

Branching Off a Main Trench

Figure 10:
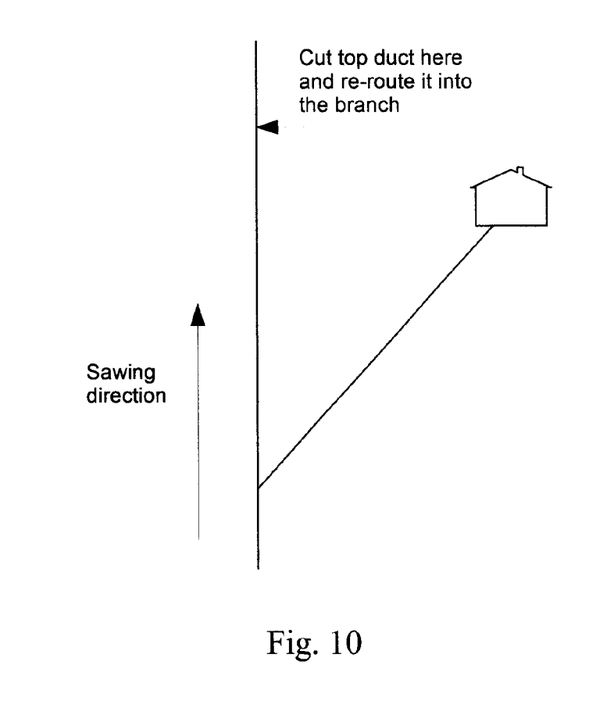
FIG. 10 shows in detail where to cut the top duct so that it will be long enough to reach its final destination.

Branching off from a main micro trench (a main micro trench is defined as a micro trench along a road) can be carried out in a number of ways. The branches may be sawn either before as shown in FIG. 6 or after the main trench is sawn. Both methods are best done at about a 45° angle from the main micro trench in order to obtain a large radius curve for the ducts/tubing. The branches may cross the location of the main micro trench or go "flush" with the main trench. When the main micro trench is sawed and the ducts/channeling tubes are laid it is easy to one by one route one of the uppermost tubes through each of the sawed branches up to each residence, as shown in FIG. 10 and to the right in FIG. 6.

An alternative method of branching is to first bore a hole at each branching point with a suitably sized core drill. The main micro trench can then be cut along all these holes in the same manner as described above as shown in FIG. 7. This method is suited both to making the house connections with a micro trench cut in the way described above as well as making house connections with controlled boring.

An alternative method of branching is to first make a hole at each branching point. The holes may be made using a suitably sized core drill (for a round hole) or using a hand tool with a diamond cutting blade or chain (for a square hole). The main micro trench can then be cut along all these holes in the same manner as described above and as shown in FIG. 7. This method is suited both to making the house connections with a micro trench cut in the way described above as well as making house connections with controlled boring. Controlled boring is sometimes preferred for making the house connections, because it avoids (e.g. goes under) obstacles like fences, hedges, trees, etc. However, another piece of expensive machinery (core drill) is needed at the installation site.

Finally, it should be understood that the present invention is not limited to the embodiments described above, but also relates to and incorporates all embodiments within the scope of the appended independent claims.

The invention claimed is:

1. A machine arranged for sawing micro trenches and placing ducts/cables in micro trenches, said machine comprising a saw blade arranged for sawing a micro trench in an area; said area comprising a first layer L 1 and a second layer L 2, said first layer L 1 being a surface layer, such as asphalt or concrete, and said second layer L 2 being a bearing layer for said first layer L 1 and being located below said first layer L 1; wherein said machine, when in operation, saws said micro trench through said first layer L 1 and into said second layer L 2; said machine further comprising a stabilizing device arranged for stabilizing the walls of said micro trench when placing ducts/cables into said micro trench, wherein said stabilizing device has a front part and a back part, said front part being located immediately behind said saw blade in said micro trench and having a section that has a shape that is complementary or near complementary to the shape of said saw blade; said stabilizing device further comprising guiding means for guiding at least one duct/cable when placed into said micro trench, wherein an operating depth for said stabilizing device in said micro trench is less than an operating depth for said saw blade, and wherein the operating depth for said saw blade can be adjusted continuously while in operation, and wherein said stabilizing device is arranged to be elevated and lowered using a pendulum movement.

2. Machine according to claim 1, wherein said stabilizing device and said saw blade are arranged to be elevated and lowered independently of each other.

3. Machine according to claim 1, wherein said stabilizing device, in its most elevated position, is lifted completely above ground level.

4. Machine according to claim 1, wherein said stabilizing device, in its most elevated position, is positioned completely behind (in the sawing direction) a vertical line, tangential to the closest side of the saw blade.

5. Machine according claim 3, wherein said stabilizing device, in its most elevated position, has a ground clearance of minimum 5 cm.

6. Machine according claim 4, wherein said stabilizing device, in its most elevated position, has a clearance (in the sawing direction) to a vertical line, tangential to the closest side of the saw blade, of minimum 5 cm.

7. Machine according to claim 1, wherein said stabilizing device is arranged to be elevated and lowered using a linear movement using an angle to the ground plane of 15-40°.

8. Machine according to claim 1, wherein said stabilizing device is arranged to be elevated and lowered using a sequential linear movement, wherein the movement is substantially horizontal, with an angle to the ground plane of 0-30°, when the stabilization device is substantially at its lowest position, and wherein the movement is vertical or a combined vertical and horizontal movement, when the stabilization device is distant from the saw blade.

9. Machine according to claim 1, wherein said pendulum movement has a center of rotation disposed inside an area defined by 4 straight lines in a coordinate system with origin in the center of the saw blade, when the saw blade is in its lowest position, and the x-axis parallel with the ground level; wherein said 4 straight lines are defined by the equations: $y=0.3*r$; $y=3*r$; $y=x$ and $x=-0.7*r$; where r is the radius of the saw blade.

10. Machine according to claim 1, wherein said stabilizing device is arranged to be elevated and lowered using a combined, continuous or sequential movement containing the elements: rotation and movement of the center of rotation.

11. Machine according to claim 10, wherein said rotation of said stabilizing device, when the stabilizing device is substantially at its lowest position, has a center of rotation near the origin in a coordinate system with origin in the center of the saw blade, when the saw blade is in its lowest position, and the x-axis parallel with the ground level.

12. Machine according to claim 11, wherein said center of rotation of said stabilization device, when the stabilization device is substantially at its highest position, has been moved continuously or sequentially to a new position near $x=a*r$ and $y=b*r$; where r is the radius of the saw blade, a is a constant $-1.5<a<-0.9$ and b is a constant $0.1<b<0.8$.

13. Machine according to claim 1, further comprising at least one drum arranged for holding ducts/cables before placing said ducts/cables into said micro trench via said stabilizing device.

14. Machine according to claim 1, wherein a closest distance between said saw blade and said stabilizing device is larger than 0 mm but less than 20 mm.

* * * * *